United States Patent
Sakai et al.

(10) Patent No.: US 11,370,437 B2
(45) Date of Patent: Jun. 28, 2022

(54) VEHICLE CONTROL DEVICE AND VEHICLE CONTROL METHOD

(71) Applicant: Toyota Jidosha Kabushiki Kaisha, Toyota (JP)

(72) Inventors: Katsuhiro Sakai, Hadano (JP); Makoto Kawaharada, Shizuoka-ken (JP); Akihide Tachibana, Susono (JP); Tomoyuki Kuriyama, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 153 days.

(21) Appl. No.: 16/733,331

(22) Filed: Jan. 3, 2020

(65) Prior Publication Data

US 2020/0223439 A1 Jul. 16, 2020

(30) Foreign Application Priority Data

Jan. 15, 2019 (JP) .............................. JP2019-004239

(51) Int. Cl.
| | |
|---|---|
| *B60W 30/18* | (2012.01) |
| *G05D 1/02* | (2020.01) |
| *G06Q 50/30* | (2012.01) |
| *G05D 1/00* | (2006.01) |

(52) U.S. Cl.
CPC ......... *B60W 30/181* (2013.01); *G05D 1/0088* (2013.01); *G05D 1/021* (2013.01); *G06Q 50/30* (2013.01)

(58) Field of Classification Search
CPC .......... B60W 30/181; B60W 60/00253; G05D 1/021; G05D 1/0088; G05D 2201/0213; G05D 1/0055; G06Q 50/30; G08G 1/096725; G08G 1/123
See application file for complete search history.

(56) References Cited

U.S. PATENT DOCUMENTS

| | | | |
|---|---|---|---|
| 10,386,845 B1* | 8/2019 | Konrardy | G05D 1/0285 |
| 2016/0284217 A1 | 9/2016 | Lee et al. | |
| 2016/0304089 A1 | 10/2016 | Miura et al. | |
| 2016/0368444 A1* | 12/2016 | Kim | E05F 15/73 |
| 2018/0105174 A1 | 4/2018 | Russell et al. | |
| 2018/0194364 A1 | 7/2018 | Asakura et al. | |
| 2018/0297612 A1 | 10/2018 | Fukamachi | |
| 2019/0371171 A1* | 12/2019 | Sholingar | G05D 1/0257 |
| 2020/0020227 A1* | 1/2020 | Ran | G08G 1/091 |

FOREIGN PATENT DOCUMENTS

| | | |
|---|---|---|
| CN | 106027749 A | 10/2016 |
| CN | 106256604 A | 12/2016 |
| CN | 107735302 A | 2/2018 |
| CN | 108725432 A | 11/2018 |
| JP | 2016-203691 A | 12/2016 |
| JP | 2017-194930 A | 10/2017 |
| JP | 2018-526715 A | 9/2018 |
| WO | 2016/209595 A1 | 12/2016 |

* cited by examiner

*Primary Examiner* — Marthe Y Marc-Coleman
(74) *Attorney, Agent, or Firm* — Dinsmore & Shohl LLP

(57) ABSTRACT

A vehicle control device includes: a stop position determination portion configured to determine a stop position at which a vehicle is stopped for a user to get in the vehicle or get off the vehicle so that a space for the user to get in or get off the vehicle is secured around a door of the vehicle, the door being used by the user when the user gets in or gets off the vehicle; and a driving controlling portion configured to perform an automatic driving control on the vehicle so that the vehicle stops at the stop position.

12 Claims, 5 Drawing Sheets

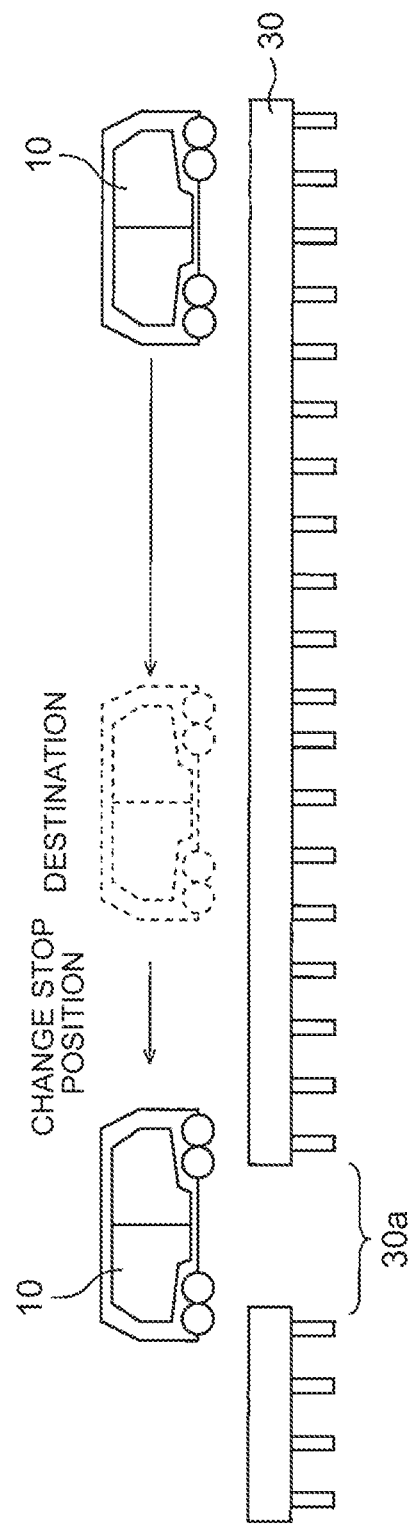

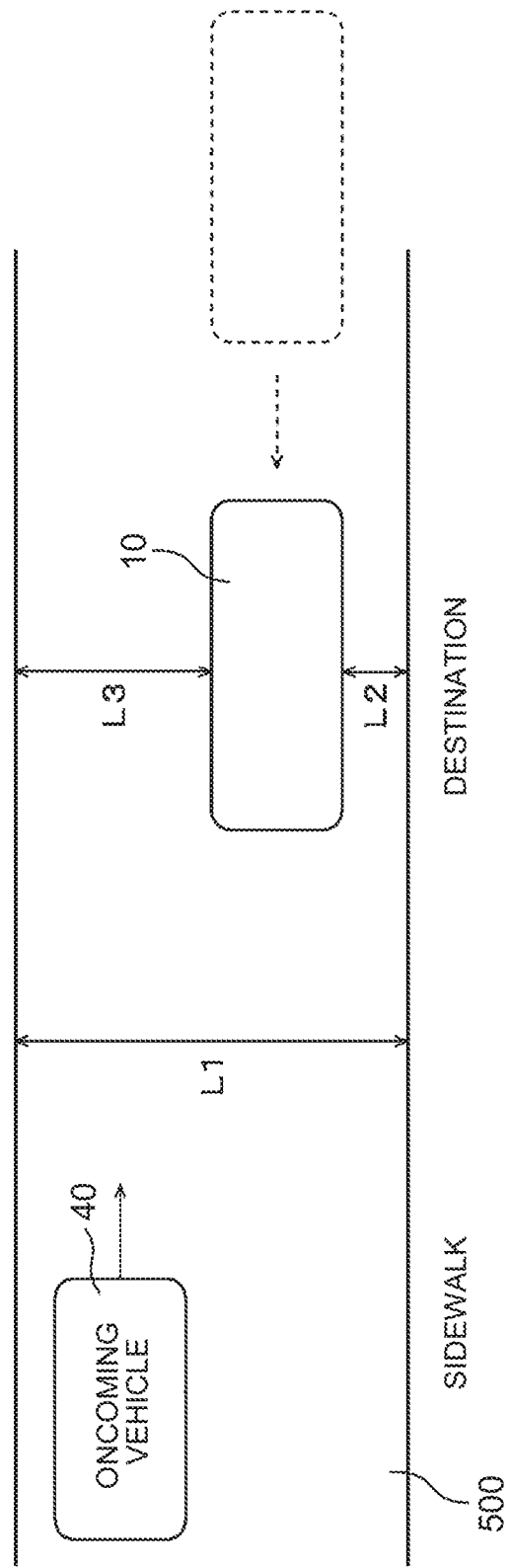

VEHICLE CONTROL DEVICE AND VEHICLE CONTROL METHOD

CROSS-REFERENCE TO RELATED APPLICATIONS

This application claims priority to Japanese Patent Application No. 2019-004239 filed on Jan. 15, 2019, which is incorporated herein by reference in its entirety including the specification, drawings and abstract.

BACKGROUND

1. Technical Field

The present disclosure relates to a vehicle control device and a vehicle control method each for performing an automatic driving control on a vehicle.

2. Description of Related Art

In the related art, a technique to perform an automatic driving control on a vehicle has been studied. In order that a user gets in or gets off the vehicle subjected to the automatic driving control, it is demanded that a step position of the vehicle subjected to the automatic driving control be set appropriately. In view of this, there has been proposed such a technique that a position where a vehicle stops is determined by referring to map information that specifies a region where the vehicle should not stop but can pass in an automatic driving mode (e.g., see US 2018-0105174 A). Further, there has been proposed such a technique that a suitable stop region suitable for a movable body to stop is determined based on a state-amount representative value and a state-amount variability indicative of how easily a state amount at a corresponding position changes over time, the state-amount representative value and the state-amount variability being included in environment map information (see Japanese Unexamined Patent Application Publication No. 2017-194930 (JP 2017-194930 A), for example).

SUMMARY

However even a position where the vehicle can stop may not necessarily be a position where the user can easily get in the vehicle or get oft the vehicle.

In view of this, an object of the present disclosure is to provide a vehicle control device that can stop a vehicle: at a position suitable for a user to get in the vehicle or get off the vehicle.

One aspect of the present disclosure is to provide a vehicle control device for performing an automatic driving control on a vehicle. The vehicle control device includes a stop position determination portion and a driving controlling portion. The stop position determination portion is configured to determine a stop position at which the vehicle is stopped for a user to get in the vehicle or get off the vehicle so that a space for the user to get in or get off the vehicle is secured around a door of the vehicle, the door being used by the user when the user gets in or gets oil the vehicle. The driving controlling portion is configured to perform the automatic driving control on the vehicle so that the vehicle stops at the stop position.

The vehicle control device may further include a storage portion in which map data showing a position of an obstacle disturbing the user when the user gets in or gets off the vehicle is stored. The stop position determination portion may refer to the map data and determine the stop position so that the obstacle is not placed in the space.

In the vehicle control device, the stop position determination portion may refer to the map data and determine the stop position within a predetermined distance from a destination as a position where the user is to net in the vehicle or a position where the user in the vehicle is to get off the vehicle.

Further in the vehicle control device, the map data may further show an unsafe region where safety of the user is not secured, and the stop position determination portion may refer to the map data and determine the stop position so that the stop position deviates from the unsafe region.

Alternatively, the vehicle control device may further include an abnormality detection portion configured to detect an abnormality occurring in the vehicle or an abnormality occurring around the vehicle, find a degree of urgency corresponding to a type of the abnormality thus detected, and change the stop position in accordance with the degree of urgency.

In this case, when the degree of urgency of the detected abnormality is higher than a predetermined threshold, the abnormality detection portion may change the stop position to a nearest position where the vehicle is stoppable.

Another aspect of the present disclosure is to provide a vehicle control method for performing an automatic driving control on a vehicle. The vehicle control method includes; determining a stop position at which the vehicle is stopped for a user to get in the vehicle or get off the vehicle so that a space for the user to get in or get off the vehicle is secured around a door of the vehicle, the door being used by the user when the user gets in or gets off the vehicle; and performing the automatic driving control on the vehicle so that the vehicle stops at the stop position.

The vehicle control device according to the present disclosure yields such an effect that the vehicle can be stopped at a position suitable for the user to get in the vehicle or get off the vehicle.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 4 is a view illustrating one example of an outline of the vehicle control process: and FIG. 5 is a view illustrating another example of the outline of the vehicle control process.

DETAILED DESCRIPTION OF EMBODIMENTS

With reference to the drawings, the following describes a vehicle control device. The vehicle control device is configured to determine a stop position (also referred to as a vehicle stop position) for a vehicle subjected to an automatic driving control so that a space for a user to open a door of the vehicle and get in the vehicle or get off the vehicle is secured around the door, and then, to stop the vehicle at the stop position thus determined.

Figure 1:
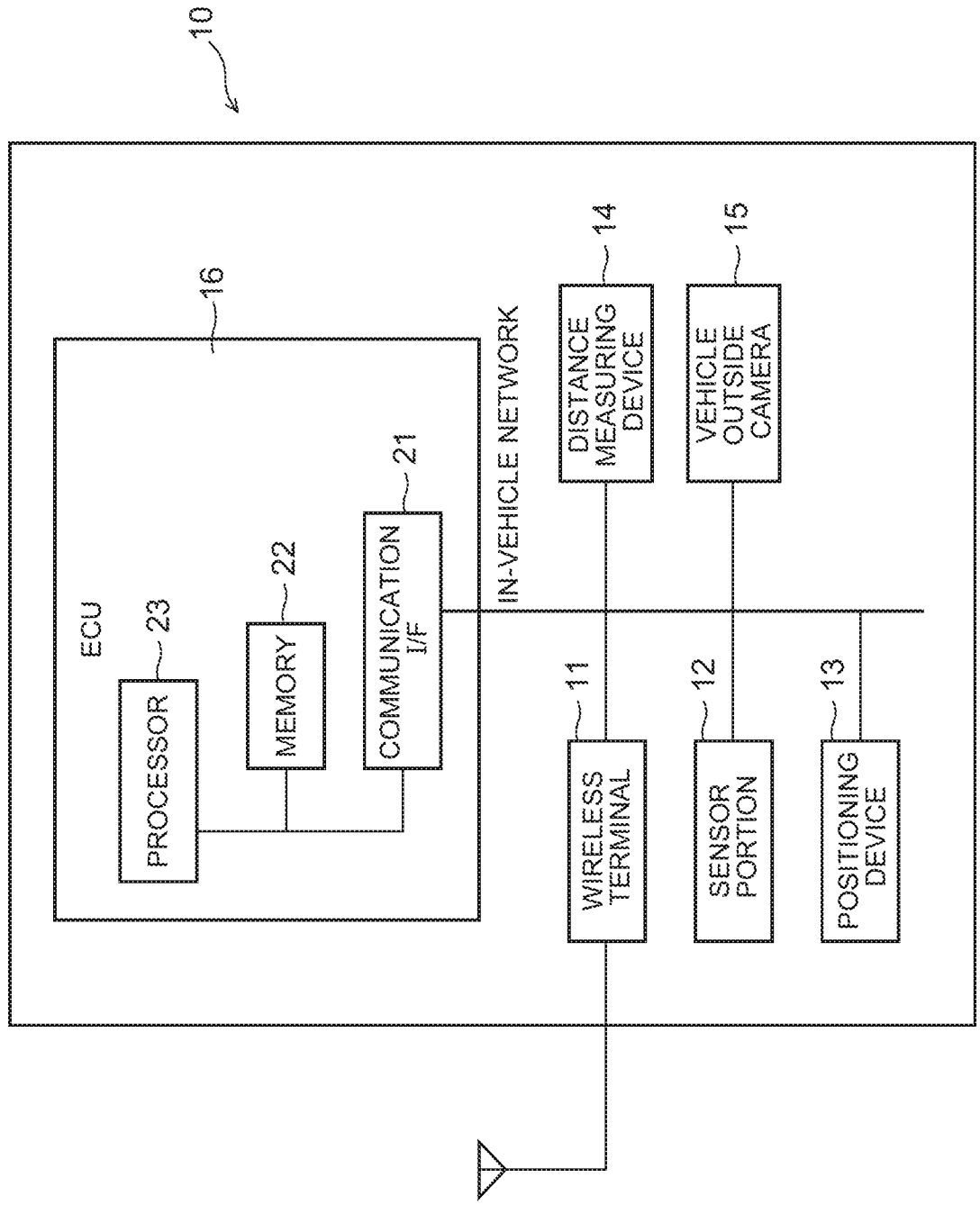
FIG. 1 is a schematic configuration diagram of an automatic driving control system for a vehicle, the automatic driving control system including an electronic control unit as one embodiment of a vehicle control device.

FIG. 1 is a schematic configuration diagram of an automatic driving control system for the vehicle, the automatic driving control system including an electronic control unit as one embodiment of the vehicle control device. In the present embodiment, the vehicle 10 includes a wireless terminal 11, a sensor portion 12, a positioning device 13, a distance measuring device 14, a vehicle outside camera 15, and an electronic control unit (ECU) 16. The wireless terminal 11, the sensor portion 12, the positioning device 13, the distance measuring device 14, and the vehicle outside camera 15 are connected to the ECU 16 communicably via an in-vehicle network provided in the vehicle 10 and conforming the standard such as Controller Area Network (CAN), for example. The vehicle 10 may further include: a storage device (not shown which map data is stored; a communicator (not shown) configured to receive a radio signal transmitted from a roadside machine and indicating a lighting state of a traffic light; and a navigation system (not shown) configured to find a travel route from a current location of the vehicle 10 to a moving destination in accordance with a predetermined route search technique such as the Dijkstra method. Further, the vehicle 10 can be a vehicle used for a mobility service such as a taxi service or a ride share service, for example. Alternatively, the vehicle 10 may be a vehicle used by a specific user.

The wireless terminal 11 is an example of a communication portion and includes an antenna and a signal processing circuit configured to execute various processes related to the wireless communication such as modulation and demodulation of the radio signal, for example. The wireless terminal 11 receives a downlink radio signal notified from a server (not shown) configured to perform a process such as vehicle allocation management and the like via a network (not shown) and a radio base station (not shown) connected to the network. The wireless terminal 11 then takes out, from the downlink radio signal, a signal (e.g., a vehicle allocation instruction including an on-board planned position and an on-board planned time of a user who is going to use the vehicle 10 and a getting-off planned position after the user gets in the vehicle, traffic information on a travel route of the vehicle 10, and the like) to be transmitted from the server to the vehicle 10, and the wireless terminal 11 transmits it to the ECU 16. Further, the wireless terminal 11 generates an uplink radio signal including a signal (e.g., a current position of the vehicle 10, the travel route, and the like) received from the ECU 16 and transmitted to the server, and the wireless terminal 11 transmits the radio signal.

The sensor portion 12 includes one or more sensors configured to measure the behavior of the vehicle 10. The sensor portion 12 includes a vehicle speed sensor, an acceleration sensor, and a gyro sensor as the sensors, for example. Every time a measured value indicative of the behavior of the vehicle 10 is provided, the sensor portion 12 outputs the measured value to the ECU 16. Further, the sensor portion 12 may include one or more sensors (e.g., a water thermometer provided in a radiator, an oil level sensor, and the like) configured to detect whether or not each portion in the vehicle 10 works normally. The sensor portion 12 outputs sensor signals from the sensors to the ECU 16.

The positioning device 13 is an example of a positioning portion and measures a position of the vehicle 10 at predetermined cycles. For this purpose, the positioning device 13 may include, for example, a receiver configured to receive a global positioning system (GPS) signal, and a computing circuit configured to calculate the position of the vehicle 10 from the GPS signal. Further, the positioning device 13 may be incorporated into the navigation system. Every time the position of the vehicle 10 is measured, the positioning device 13 outputs a measured value to the ECU 16.

The distance measuring device 14 is an example of a range-finding portion and is configured to measure a distance to an object present around the vehicle 10. For this purpose, the distance measuring device 14 includes a radar, a light detection and ranging sensor, a laser imaging detection and ranging (LIDAR) sensor, or an ultrasonic sensor configured to measure a distance to an object present in each direction within a predetermined scanning range. In the present embodiment, in order to check a space around a door, the distance measuring device 14 may be attached so that the distance measuring device 14 can measure a distance to an object present in a direction of a surface of the vehicle 10 on which the door is provided, e.g., in a direction of each of the left and right side faces of the vehicle 10. Every time the distance measuring, device 14 measures the distance to the object around the vehicle 10 in each direction, the distance measuring device 14 outputs the distance thus measured in each direction to the ECU 16.

The vehicle outside camera 15 is an example of an imaging portion and includes a two-dimensional detector such as CCD or C-MOS that is constituted by an array of photoelectric conversion elements having sensibility to visible light, and an imaging optical system configured to form an image of a region targeted for imaging on the two-dimensional detector. The vehicle outside camera 15 is attached inside a vehicle cabin of the vehicle 10 to face forward or face a lateral side from the vehicle 10, for example. The vehicle outside camera 15 captures an image of a region around the vehicle 10 at predetermined image-capture cycles (e.g., every $1/30$ seconds to $1/10$ seconds) and generates an image of the region. The image obtained by the vehicle outside camera 15 may be a color image or a gray image.

Every time the vehicle outside camera 15 generates an image, the vehicle outside camera 15 outputs the image thus generated to the ECU 16.

The ECU 16 performs automatic driving control on the vehicle 10 and controls each portion of the vehicle 10. For this purpose, the ECU 16 includes a communication interface 21 for communicating with each portion of the vehicle 10, a menial 22, and a processor 23, example.

The communication interface 21 includes an interface circuit configured to connect the ECU 16 to the in-vehicle network. That is, the communication interface 21 is connected to the wireless terminal 11, the sensor portion 12, the positioning device 13, the distance measuring device 14, and the vehicle outside camera 15 via the in-vehicle network. The communication interface 21 transmits a signal received from the server such as a vehicle allocation instruction or traffic information to the processor 23 from the wireless terminal 11. Similarly, the communication interface 21 transmits to the processor 23, a measured value received from the sensor portion 12, a measured value of the current position of the vehicle 10 that is received from the positioning device 13, a distance to an object around the vehicle 10 per direction that is received from the distance measuring device 14, and an image received from the vehicle outside camera 15.

The memory 22 is an example of a storage portion and includes, for example, a volatile semiconductor memory and a nonvolatile semiconductor memory. Then, in the memory 22, data to be used, in various processes executed by the processor 23 of the ECU 16, e.g., the current position of the vehicle 10, the distance to the object around the vehicle 10 per direction, the image received from the vehicle outside camera 15, and the on-board planned position and the getting-off planned position, and the like are stored. Further, map data or the like may be stored in the memory 22. The map data includes, for example, information indicative of a position where an obstacle (e.g., a guard rail, a streetlight, and the like) that disturbs the user at the time when the user gets in the vehicle 10 or gets off the vehicle 10 is placed. The map data may further include information indicative of an unsafe region where the safety of the User is not secured. Furthermore, the map data may, include information indicative of a road environment per road, e.g., the number of lanes of the road, the width of the road, and whether the road is one way or not. Furthermore, the map data may include information indicative of a parking and stopping prohibition region where parking and stop of a vehicle are prohibited by law.

The processor 23 includes one or more central processing units (CPU) and a peripheral circuit thereof. The processor 23 may further include other computing circuits such as a logic-arithmetic unit, a mathematical operation unit, and a graphics processing unit. When the vehicle 10 receives a vehicle allocation instruction, the processor 23 notifies the navigation system of the current position of the vehicle 10 and the on-board planned position included in the vehicle allocation instruction and causes the navigation system to search for a travel route from the current position of vehicle 10 to the on-board planned position. Then, the processor 23 performs an automatic driving control on the vehicle 10 so that the vehicle 10 travels along the travel route. Further, when the user gets in the vehicle 10, the processor 23 notifies the navigation system of the position of the vehicle 10 that is measured by the positioning device 13 when the user gets in the vehicle 10, and the getting-off planned position included in the vehicle allocation instruction. Then, the processor 23 causes the navigation system to search for a travel route from the position of the vehicle 10 where the user gets in the vehicle 10 to the getting-off planned position. Note that the user may operate the navigation system and input the getting-off planned position, and the navigation system may search for a travel route to the getting-off planned position thus input. Then, the processor 23 performs an automatic driving control on the vehicle 10 so that the vehicle 10 travels along the travel route. Note that, when the travel route is notified from the server, the processor 23 may cause the vehicle 10 to travel, along the travel route thus notified. Further, the processor 23 executes a vehicle control process including a determination process of a stop position. Furthermore, the processor 23 may transmit the travel route found by the navigation system to the server together with identification information of the vehicle 10 via the wireless terminal 11. Furthermore, the processor 23 may transmit a measured value of the current position of the vehicle 10, measured by the positioning device 13, to the server together with the identification information of the vehicle 10 via the wireless terminal 11 at predetermined cycles (e.g., every 30 seconds, one minute, or five minutes).

Figure 2:
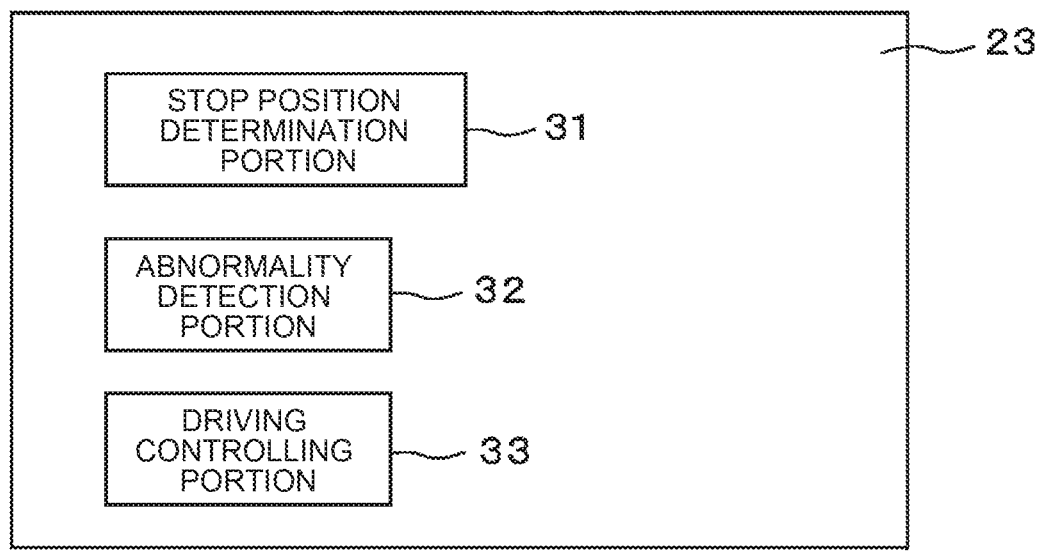
FIG. 2 is a functional block diagram of a processor of the electronic control unit.

FIG. 2 is a functional block diagram of the processor 23 of the ECU 16 in terms of the vehicle control process. The processor 23 includes a stop position determination portion 31, an abnormality detection portion 32, and a driving controlling portion 33. These portions provided in the processor 23 are functional modules implemented by a computer program that works on the processor 23, for example. Alternatively, these portions provided in the processor 23 may be exclusive computing circuits provided in the processor 23.

When the vehicle 10 approaches, within a predetermined distance, a destination such as the on-board planned position or the getting-off planned position where the vehicle 10 is stopped so that the user gets in the vehicle 10 or gets oil the vehicle 10, the stop position determination portion 31 determines a stop position for the vehicle 10. At this time, the stop position determination portion 31 determines the stop position for the vehicle 10 so that a space for the user to open a door of the vehicle 10 and get in the vehicle 10 or get off the vehicle 10 is secured around the door of the vehicle 10. Note that the space for the user to get in or get off the vehicle 10 can be a space where the door of the vehicle 10 can be opened by at least an angle that allows the user to get in or get off the vehicle 10, for example. Alternatively, in a case where the door of the vehicle 10 is a sliding door, the space for the user to get in or gel off the vehicle 10 can be a space where general people can walk along the vehicle 10. Further, the door used by the user may be set in advance such as a door provided on the left side face of the vehicle 10 when the vehicle 10 faces its traveling direction. Alternatively, the door used by the user may be designated by the vehicle allocation instruction.

For example, the stop position determination portion 31 refers to the map data and specifies a position where an obstacle such as a guard rail is not placed within a predetermined distance from the destination, and the stop position determination portion 31 determines the stop position so that the door of the vehicle 10 is placed at the specified position when the vehicle 10 stops, that is, no obstacles are placed within the space for the user to get in the vehicle 10 or get off the vehicle 10.

Alternatively, the stop position determination portion 31 may refer to the distance to the object around the vehicle 10 that is measured by the distance measuring device 14 and determine the stop position for the vehicle 10 so that the distance to the object around the vehicle 10 is at least a distance (hereinafter also referred to as a door openable distance) necessary to open the door of the vehicle 10 in a region around the door of the vehicle 10. For example, the stop position determination portion 31 lakes a stop position found by referring to the map data as described above as a slop position candidate, and when the vehicle 10 reaches a position as the stop position candidate, the stop position determination portion 31 compares, with the door openable distance, the distance to the object around the vehicle 10 in the region around the door, the distance being measured by the distance measuring device 14. When the distance to the object is the door openable distance or more, the stop position determination portion 31 may take this candidate position as the stop position. In the meantime, when the distance to the object around the vehicle 10 in the region around the door is less than the door openable distance, the stop position determination portion 31 may set, as a new candidate position, a position moved from the aforementioned candidate position only by a predetermined distance so that the space around the door expands, and the stop position determination portion 31 may repeat the aforementioned process.

The stop position determination portion 31 determines the stop position so that the stop position satisfies the above condition within the predetermined distance from the destination and the stop position is not included in the parking and stopping prohibition region, for example. For this purpose, the stop position determination portion 31 sets the destination as an initial stop position candidate, for example, and searches for a stop position candidate that satisfies the above condition while the stop position determination portion 31 changes a position to become the stop position candidate sequentially from the initial stop position candidate. Then, for example, the stop position determination portion 31 sets a candidate position nearest to the destination as the stop position.

The stop position determination portion 31 notifies the abnormality detection portion 32 and the driving controlling portion 33 of the stop position thus determined.

In a case where the vehicle 10 is placed within the predetermined distance from the destination, the abnormality detection portion 32 detects an abnormality caused in the vehicle 10 or in a region around the vehicle 10. Then, the abnormality detection portion 32 finds a degree of urgency indicative of how urgently an occupant or the vehicle 10 must deal with the abnormality, in accordance with the type of the abnormality thus detected, and the abnormality detection portion 32 changes the stop position determined by the stop position determination portion 31 in accordance with the degree of urgency.

For example, when a measured value of an acceleration detected by the acceleration sensor included in the sensor portion 12 is a predetermined threshold or more, the abnormality detection portion 32 detects the occurrence of an accident as the abnormality caused in the vehicle 10.

Further, in a case where a radio signal including traffic-light state information indicative of a lighting state of a traffic light cannot be received from a roadside machine even when the vehicle 10 approaches, within a predetermined distance, an intersection where the traffic light is provided, the abnormality detection portion 32 detects acquisition failure of the traffic-light state information as the abnormality caused in the vehicle 10.

Further, when the abnormality detection portion 32 receives a signal indicative of a malfunction or a signal indicating that a malfunction might occur in terms of any component in the vehicle 10, from one or more sensors included in the sensor portion 12 and configured to detect whether each portion in the vehicle 10 works normally or not, the abnormality detection portion 32 detects the malfunction as the abnormality caused in the vehicle 10.

Further, when the abnormality detection portion 32 is notified, from the positioning device 13, that a positioning signal cannot be received, the abnormality detection portion 32 determines that estimation accuracy of the position of the vehicle 10 decreases. Then, the abnormality detection portion 32 detects the decrease of the estimation accuracy of the position of the vehicle 10 as the abnormality caused in the vehicle 10.

Furthermore, the abnormality detection portion 32 may detect an abnormality around the vehicle 10 from an image acquired by the vehicle outside camera 15. For example, the abnormality detection portion 32 inputs the image acquired by the vehicle outside camera 15 into a discriminator teaming, in advance, to detect a matter that can cause an abnormality, so that the abnormality detection portion 32 determines whether the matter that can cause an abnormality appears in the image thus input or not. The matter that can cause an abnormality can be fire, an animal, or a foreign matter (e.g., a cardboard box, a fallen tree, or the like) on the road, for example. The discriminator can be a convolutional neural network or a support vector machine, for example. The abnormality detection portion 32 detects an abnormality around the vehicle 10, for example, by referring to a reference table indicative of the correspondence between the type of at expected abnormality and a combination of the type of the matter that can cause an abnormality, detected from the image, the state of the vehicle 10 such as the speed of the vehicle 10, acquired by the sensor portion 12, traffic information at the current position of the vehicle 10, a road structure (e.g., an intersection, an express highway, or the like) shown on the map data, and so on. Note that such a reference table is stored in the memory 22 in advance, for example. Alternatively, the abnormality detection portion 32 may detect an abnormality around the vehicle 10 by inputting, into a discriminator, a combination of the type of the matter that can cause an abnormality, detected from the image acquired by the vehicle outside camera 15, the state of the vehicle 10, the traffic information at the current position of the vehicle 10, the road structure shown on the map data, and so on. The discriminator has learned, in advance, to determine the type of an expected abnormality with respect to the combination. Such a discriminator can be a multilayer-perception neural network or a support vector machine, for example.

When the abnormality detection portion 32 detects some sort of abnormality. The abnormality detection portion 32 determines the degree of urgency of the abnormality thus detected. For example, the abnormality detection portion 32 can determine the degree of urgency corresponding to the detected abnormality by referring to a reference table indicative of the correspondence between the abnormality type and the degree of urgency. Note that the degree of urgency is set to a higher value as the safety to the user in the vehicle 10 and people around the vehicle 10 is lower, for example. For example, the degree of urgency is expressed by 1 to 10. When the detected abnormality is an accident, for example, the degree of urgency is 10 that is highest. Further, when the detected abnormality is acquisition failure of the traffic-light state information, the degree of urgency is 6. Further, when the detected abnormality is a malfunction, the degree of urgency is 5. Further, when the detected abnormality is a decrease of the estimation accuracy of the position if the vehicle 10, the degree of urgency is 3.

The abnormality detection portion 32 changes the stop position determined by the stop position determination portion 31 in accordance with the degree of urgency of the detected abnormality. For example, when the degree of urgency is higher than a predetermined threshold, the abnormality detection portion 32 changes the stop position to a nearest position where the vehicle 10 can stop. The nearest position where the vehicle 10 can stop can be, for example, a position where the vehicle 10 can stop when deceleration at a predetermined deceleration continues from a current speed of the vehicle 10. The predetermined threshold is set to an upper limit (5 in the above example) of the degree of urgency at which it is assumed that an accident does not occur immediately even if the vehicle 10 continues traveling, for example. In the meantime, when the degree of urgency is the predetermined threshold or less, the stop position is not changed.

Alternatively, the abnormality detection portion 32 may set different positions to be changed from the stop position in accordance with the degree of urgency of the detected abnormality. For example, when the degree of urgency is higher than a first threshold, the abnormality detection portion 32 changes the stop position to the nearest position where the vehicle 10 can stop. In the meantime, when the degree of urgency is not more than the first threshold but higher than a second threshold that is lower than the first threshold, the abnormality detection portion 32 changes the stop position to a relatively safe place, e.g., a road shoulder ahead of the current position of the vehicle 10 by a predetermined distance (e.g., 100 in to 200 m). Further, when the degree of urgency is the second threshold or less, the abnormality detection portion 32 does not change the stop position.

When the stop position is changed, the abnormality detection portion 32 notifies the driving controlling portion 33 of the stop position thus changed.

The driving controlling portion 33 performs an automatic driving control on the vehicle 10 so that the vehicle 10 travels along a set travel route. At this time, the driving controlling portion 33 controls a steering wheel of the vehicle 10 by referring to the map data and the current position of the vehicle 10 so that the vehicle 10 travels on a road designated by the travel route. Further, the driving controlling portion 33 controls a power train and a brake mechanism of the vehicle 10 so that the vehicle speed of the vehicle 10 is maintained at not more than a regulation speed or a maximum speed at the current position of the vehicle 10. Further, the driving controlling portion 33 controls the steering wheel, the power train, and the brake mechanism of the vehicle 10 so that the vehicle 10 stops at the determined stop position.

Figure 3:
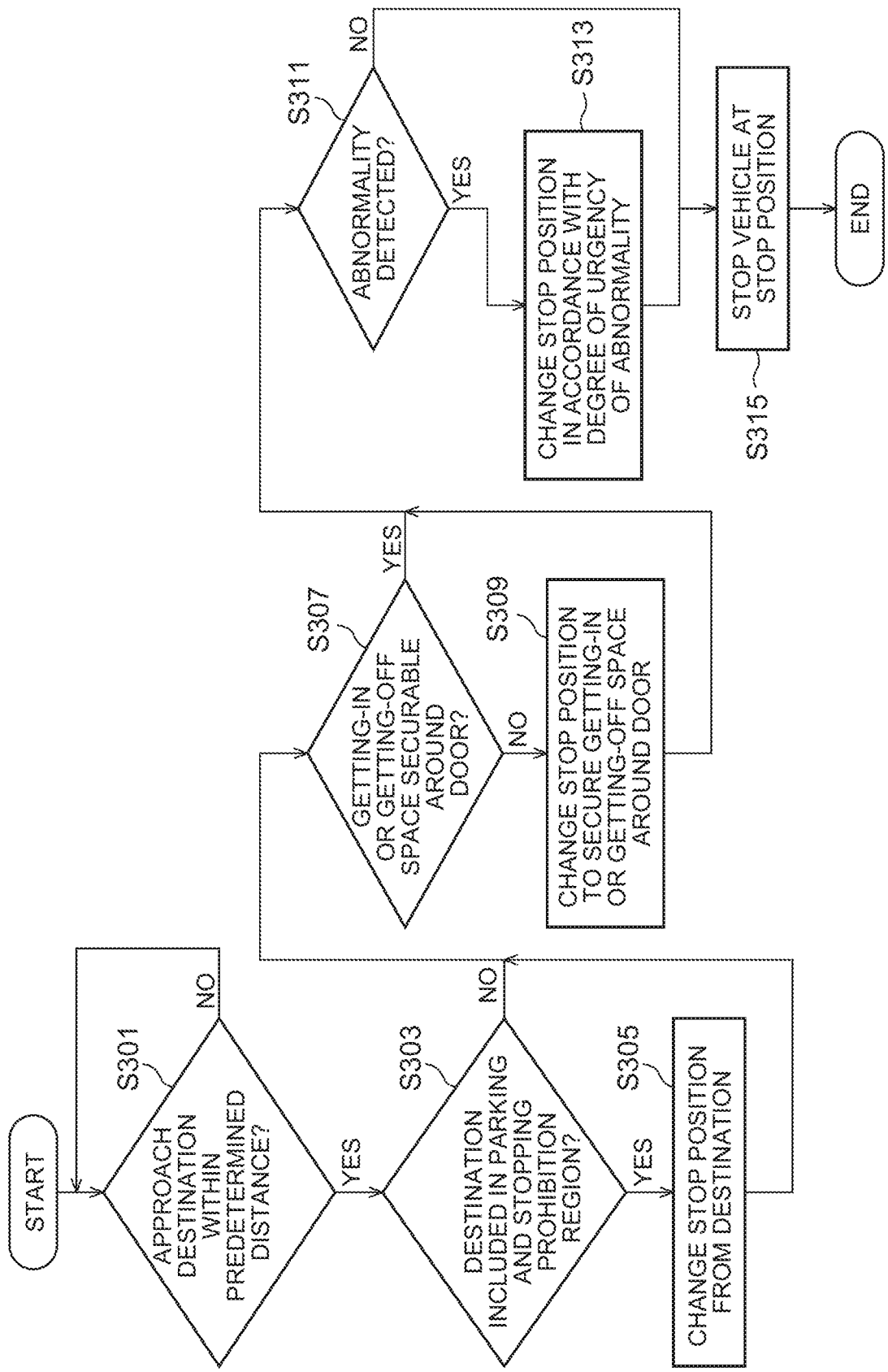
FIG. 3 is a flowchart of a vehicle control process.

FIG. 3 is an operation flowchart of the vehicle control process including a stop position determination process to be executed by the processor 23. Note that, in the following operation flowchart, the destination is set as an initial stop position candidate.

The stop position determination portion 31 of the processor 23 determines whether the vehicle 10 approaches the destination within a predetermined distance from the destination or not, based on the current position of the vehicle. 10 that is specified by positioning information acquired by the positioning device 13 and the travel route (step S301). When a distance from the current position of the vehicle 10 to the destination along the travel route is longer than the predetermined distance, that is, when the vehicle 10 does not reach a region within the predetermined distance from the destination (step S301—No), the processor 23 repeats the process of step S301 after a predetermined time has elapsed (e.g., after 0.1 seconds to one second).

In the meantime when the distance from the current position of the vehicle 10 to the destination along the travel route is the predetermined distance or less, that is, when the vehicle 10 approaches the destination within the predetermined distance from the destination (step S301—Yes), the stop position determination portion 31 refers to the map data and determines whether the destination as the initial stop position candidate is included in a parking and stopping prohibition region or not (step S303). When the destination is included in the parking and stopping prohibition region (step S303—Yes), the stop position determination portion 31 changes the stop position from the destination to a position outside the parking and stopping prohibition region (step S305). At this time, the stop position determination portion 31 sets, as the stop position, a position, outside the parking and stopping prohibition region, that the vehicle 10 can reach with a shortest distance from the destination along a road where the vehicle 10 can travel, for example.

After step S305, or when the destination is not included in the parking and stopping prohibition region in step S303, that is, when the stop position is not changed from the initial stop position candidate (step S303—No), the stop position determination portion 31 determines whether or not a space for the user to get in the vehicle 10 or get off the vehicle 10 can be secured around the door of the vehicle 10 at the stop position (step S307). For example, as described above, the stop position determination portion 31 refers to the map data and determines whether or not an obstacle that disturbs the user at the time of getting in or getting off the vehicle 10 is present around the door of the vehicle 10 at the stop position. When there is not such an obstacle, the stop position determination portion 31 determines that the space for the user to get in the vehicle 10 or get off the vehicle 10 can be secured around the door of the vehicle 10 at the stop position. In the meantime, when the obstacle that disturbs the user at the time of getting in or getting off the vehicle 10 is present around the door of the vehicle 19 at the stop position, the stop position determination portion 31 determines that the space for the user to get in the vehicle 10 or get off the vehicle 10 cannot be secured around the door of the vehicle 10 at the stop position.

When the space for the user to get in the vehicle 10 or get off the vehicle 10 cannot be secured around the door of the vehicle 10 at the stop position (step S307—No), the stop position determination portion 31 changes the stop position so that the space for the user to get in the vehicle 10 or act off the vehicle 10 can be secured around the door of the vehicle 10 at the stop position (step S309). For example, the stop position determination portion 31 refers to the map data and specifies a position without any obstacle that is placed outside the parking and stopping prohibition region and nearest from the stop position that has not been changed. Then, the stop position determination portion 31 determines a stop position so that the position without any obstacle is placed around the door. Alternatively, the stop position determination portion 31 may change the stop position, so that the space for the user to get in the vehicle 10 or get off the vehicle 10 can be secured in accordance with the measured value of the distance to the obstacle around the door of the vehicle 10 as described above, the measured value being measured by the distance measuring device 14.

After step S309, or when the space for the user to get in the vehicle 10 or get off the vehicle 10 can be secured around the door of the vehicle 10 at the stop position in step S307 (step S307—Yes), the abnormality detection portion 32 of the processor 23 determines whether or not some sort of abnormality can be detected in the vehicle 10 or in the region around the vehicle 10 (step S311). When some sort of abnormality is detected (step S311—Yes), the abnormality detection portion 32 changes the stop position in accordance with the degree of urgency corresponding to the abnormality thus detected (step S313). At this time, when the degree of urgency is higher than the predetermined threshold as described above, for example, the abnormality detection portion 32 changes the stop position to a nearest position where the vehicle 10 can stop.

After step S313, or when no abnormality is detected in step S311 (step S311—No), the driving controlling portion 33 of the processor 23 performs an automatic driving control on the vehicle 10 so that the vehicle 10 stops at the determined stop position (step S315). Then, the processor 23 finishes the vehicle control process.

FIG. 4 is a view illustrating an example of an outline of the vehicle control process. In this example, a guard rail 30 is present at the destination of the vehicle 10 in the travel route. On this account, the ECU 16 determines that, if the vehicle 10 stops at the destination, the space for the user to get in the vehicle 10 or get off the vehicle 10 cannot be secured around the door of the vehicle 10, because the guard rail 30 is present around the door of the vehicle 10 in view of this, in the present embodiment, the ECU 16 changes the stop position of the vehicle 10 from the destination so that the door of the vehicle 10 is placed at a position 30a as a gap of the guard rail 30. Hereby, the user can easily get in the vehicle 10 or get off the vehicle 10.

As described above, the vehicle control device determines the stop position for the vehicle so that the space for the user to get in the vehicle or get off the vehicle is secured around the door of the vehicle. On this account, the vehicle control device can stop the vehicle at a position suitable for the user to get in the vehicle or get off the vehicle.

As a modification, the stop position determination portion 31 may determine the stop position for the vehicle 10 so that the safety of the user who gets in the vehicle 10 or the user who gets off the vehicle 10 is secured in a space around the door of the vehicle 10 when the vehicle 10 stops, that is, the space deviates from an unsafe region where the safety of the user is not secured. For example, the unsafe region may be shown on the map data. The unsafe region may include, for example, a slope with a predetermined gradient or more, a place with a poor sight, or a place with a predetermined traffic volume or more. The stop position determination portion 31 may refer to the map data and determine the stop position for the vehicle 10 so that the space around the door of the vehicle 10 when the vehicle 10 stops is not in the middle of a slope shown as an unsafe region. Further, the stop position determination portion 31 may refer to the map data and determine the stop position for the vehicle 10 so that the space around the door of the vehicle 10 when the vehicle 10 stops is not included in a region with a poor sight that is shown as an unsafe region. Further, the stop position determination portion 31 may determine the stop position for the vehicle 10 so that the space around the door of the vehicle 10 when the vehicle 10 stops is not placed on a lane where other vehicles can pass (e.g., an opposite lane in a two-way traffic road, or a lane adjacent to the left side of a lane where the vehicle 10 is placed in a case where the left door of the vehicle 10 is used when the user gets in or gets off the vehicle 10).

Further, the stop position determination portion 31 may determine the stop position so that, while the space for the user to get in the vehicle or get off the vehicle is secured around the door of the vehicle, other vehicles can pass by the vehicle on a side opposite from the side face of the vehicle 10, the side face being provided with the door to be used by the user to get in or get off the vehicle 10 when the vehicle 10 stops at the stop position. At this time, the stop position determination portion 31 refers to information indicative of a road environment shown on the map data, for example, and sets the stop position on a road with a width of not less than a lower limit that allows other vehicles to pass as described above.

FIG. 5 is a view illustrating another example of the outline of the vehicle control process in this modification. In this example, L1 indicates the width of a road 500. Further, L2 indicates a distance to a sidewalk of the road 500 from the side face of the vehicle 10 from which the user gets in or gets off the vehicle 10 when the vehicle 10 stops at the stop position. Further, L3 indicates a distance obtained when the width of the vehicle 10 and the distance L2 are subtracted from the width L1 of the road 500. In this case, the stop position determination portion 31 determines the stop position for the vehicle 10 so that the distance L3 is larger than a width necessary for an oncoming vehicle 40 to pass by the side of the vehicle 10. However, in a case where the distance L3 is larger than the width necessary for the oncoming vehicle 40 to pass by the side of the vehicle 10, when the distance L2 to the sidewalk of the road 500 from the side face of the vehicle 10 from which the user gets in or gets off the vehicle 10 is less than the space for the user to get in or get off the vehicle 10, the stop position determination portion 31 does not set the stop position on the road 500. In this case, the stop position determination portion 31 may set the stop position in a road with a wider lane width or a parking lot in the vicinity.

Further, a computer program to implement a function of each part of the processor of the vehicle control device in the embodiment or the modification may be provided in such form that the computer program is stored in a portable computer-readable recording medium such as a semiconductor memory, a magnetic recording medium, or a photo-recording medium.

As described above, a person skilled in the art can perform various changes in accordance with a form to be carried out within the scope of the present disclosure.

What is claimed is:

1. A vehicle control device for performing an automatic driving control on a vehicle, the vehicle control device comprising:
    an electronic control unit configured to:
        in response to the vehicle entering a predetermined distance of a destination where the vehicle is to be stopped, determine an initial stop position candidate at which the vehicle is stopped for a user to get in the vehicle or get off the vehicle so that a space for the user to get in or get off the vehicle is secured around a door of the vehicle by referring to map data, the door being used by the user when the user gets in or gets off the vehicle;
        perform the automatic driving control on the vehicle so that the vehicle stops at the initial stop position candidate;
        upon stopping at the initial stop position candidate, compare a door openable distance to an obstacle distance between the door and an obstacle;
        in response to determining that the obstacle distance is at least equal to the door openable distance, set the initial stop position candidate as a stop position; and
        in response to determining that the obstacle distance is less than the door openable distance, determine a second stop position candidate moved from the initial stop position candidate by a predetermined distance so that the obstacle distance increases to be at least equal to the door openable distance, and set the second stop position candidate as the stop position.

2. The vehicle control device according to claim 1, further comprising a storage portion in which the map data showing a position of the obstacle disturbing the user when the user gets in or gets off the vehicle is stored, wherein the electronic control unit refers to the map data and determines the initial stop position candidate so that the obstacle is not placed in the space.

3. The vehicle control device according to claim 2, wherein the electronic control unit refers to the map data and determines the initial stop position candidate within the predetermined distance from the destination as a position where the user is to get in the vehicle or a position where the user in the vehicle is to get off the vehicle.

4. The vehicle control device according to claim 2, wherein:
    the map data further shows an unsafe region where safety of the user is not secured; and
    the electronic control unit refers to the map data and determines the stop position so that the stop position deviates from the unsafe region.

5. The vehicle control device according to claim 1, wherein the electronic control unit is further configured to detect an abnormality occurring in the vehicle or an abnormality occurring around the vehicle, find a degree of urgency corresponding to a type of the abnormality thus detected, and change the stop position in accordance with the degree of urgency.

6. The vehicle control device according to claim 5, wherein, when the degree of urgency of the detected abnormality is higher than a predetermined threshold, the electronic control unit is configured to change the stop position to a nearest position where the vehicle is stoppable.

7. A vehicle control method for performing an automatic driving control on a vehicle, the vehicle control method comprising:
   in response to the vehicle entering a predetermined distance of a destination where the vehicle is to be stopped, determining an initial stop position candidate at which the vehicle is stopped for a user to get in the vehicle or get off the vehicle so that a space for the user to get in or get off the vehicle is secured around a door of the vehicle by referring to map data, the door being used by the user when the user gets in or gets off the vehicle;
   performing the automatic driving control on the vehicle so that the vehicle stops at the initial stop position candidate;
   upon stopping at the initial stop position candidate, comparing a door openable distance to an obstacle distance between the door and an obstacle;
   in response to determining that the obstacle distance is at least equal to the door openable distance, setting the initial stop position candidate as a stop position; and
   in response to determining that the obstacle distance is less than the door openable distance, determining a second stop position candidate moved from the initial stop position candidate by a predetermined distance so that the obstacle distance increases to be at least equal to the door openable distance, and set the second stop position candidate as the stop position.

8. The vehicle control method according to claim 7, further comprising:
   storing the map data showing a position of the obstacle disturbing the user when the user gets in or gets off the vehicle is stored; and
   determining the initial stop position candidate by referring to the map data so that the obstacle is not placed in the space.

9. The vehicle control method according to claim 8, wherein the stop position is determined by referring to the map data such that the initial stop position candidate is within the predetermined distance from the destination as a position where the user is to get in the vehicle or a position where the user in the vehicle is to get off the vehicle.

10. The vehicle control method according to claim 8, wherein:
    the map data further shows an unsafe region where safety of the user is not secured; and
    the stop position is determined by referring to the map data such that the stop position deviates from the unsafe region.

11. The vehicle control method according to claim 7, further comprising:
    detecting an abnormality occurring in the vehicle or an abnormality occurring around the vehicle;
    finding a degree of urgency corresponding to a type of the abnormality thus detected; and
    changing the stop position in accordance with the degree of urgency.

12. The vehicle control method according to claim 11, wherein, when the degree of urgency of the detected abnormality is higher than a predetermined threshold, the stop position is changed to a nearest position where the vehicle is stoppable.

* * * * *